(«12») United States Patent
Martin et al.

(10) Patent No.: US 7,944,840 B2
(45) Date of Patent: May 17, 2011

(54) METHOD FOR FACILITATING LATENCY MEASUREMENTS USING INTERMEDIATE NETWORK DEVICES BETWEEN ENDPOINT DEVICES CONNECTED BY A COMPUTER NETWORK

(75) Inventors: David Samuel Martin, Pleasanton, CA (US); Stefan Mattias Mattsson, San Jose, CA (US)

(73) Assignee: Edgewater Networks, Inc., Santa Clara, CA (US)

( * ) Notice: Subject to any disclaimer, the term of this patent is extended or adjusted under 35 U.S.C. 154(b) by 155 days.

(21) Appl. No.: 12/583,306

(22) Filed: Aug. 17, 2009

(65) Prior Publication Data

US 2011/0038270 A1 Feb. 17, 2011

(51) Int. Cl.
*G01R 31/08* (2006.01)
*H04J 1/16* (2006.01)
(52) U.S. Cl. .................. 370/236; 370/252; 370/352
(58) Field of Classification Search ............ 370/236, 370/252, 352–356, 395.52
See application file for complete search history.

(56) References Cited

U.S. PATENT DOCUMENTS

| 7,525,952 | B1 * | 4/2009 | Shankar et al. ............ 370/352 |
| 7,551,623 | B1 | 6/2009 | Feroz et al. |
| 7,693,062 | B2 * | 4/2010 | Perkins et al. ............ 370/235 |
| 7,751,316 | B2 * | 7/2010 | Yarlagadda et al. ......... 370/230 |
| 2003/0016627 | A1 | 1/2003 | Melampy et al. |
| 2004/0066753 | A1 * | 4/2004 | Grovenburg ............ 370/252 |
| 2005/0123003 | A1 | 6/2005 | Bordonaro et al. |
| 2008/0049620 | A1 * | 2/2008 | Riga et al. ............ 370/236 |
| 2008/0049635 | A1 * | 2/2008 | Huang et al. ............ 370/252 |
| 2008/0144624 | A1 | 6/2008 | Marcondes et al. |
| 2009/0279537 | A1 * | 11/2009 | Strickland et al. ......... 370/352 |
| 2010/0188989 | A1 * | 7/2010 | Wing et al. ............ 370/252 |

OTHER PUBLICATIONS

Blue Coat Systems, Inc., "Measure VoIP Metrics" downloaded Aug. 17, 2009 from https://bto.bluecoat.com/packetguide/8.0/nav/tasks/measurement/voip-metrics.htm.

* cited by examiner

*Primary Examiner* — Kwang B Yao
*Assistant Examiner* — Candal Elpenord
(74) *Attorney, Agent, or Firm* — Lumen Patent Firm

(57) ABSTRACT

Network latency measurements of RTP traffic are measured using an intermediate network device positioned between endpoints that do not necessarily support RTCP. During an active RTP stream between two endpoints, the intermediate device detects whether the endpoints are already providing their own RTCP packets and responding to RTCP packets from the other endpoint. If not, the intermediate device generates RTCP packets on behalf of the non-responsive or non-providing endpoint(s), acting as a proxy for the endpoint(s), so the packets appear to one endpoint as if they were generated by the other endpoint. Thus, if at least one endpoint supports RTCP, a single intermediate device is sufficient to generate the RTCP packets that allow the latency calculation to be performed.

13 Claims, 2 Drawing Sheets

METHOD FOR FACILITATING LATENCY MEASUREMENTS USING INTERMEDIATE NETWORK DEVICES BETWEEN ENDPOINT DEVICES CONNECTED BY A COMPUTER NETWORK

FIELD OF THE INVENTION

The present invention relates generally to computer data networks. More specifically, it relates to techniques and devices for managing real time data streams flowing between endpoint devices on a computer network.

BACKGROUND OF THE INVENTION

Many communications and other services are deployed over computer networks which include a combination of local area networks (LANs) and wide area networks (WANs). In many cases, such as voice over internet protocol (VoIP), the service relies upon the transmission of a real time data stream between two endpoint devices, such as VoIP telephone devices. The standard real-time transport protocol (RTP) is typically used to carry such media data streams.

To ensure quality of service (QoS), techniques have been developed for managing end-to-end performance between endpoint devices. Such management techniques may involve, for example, measuring, monitoring, recording, analyzing, and/or reporting the latency of the data streams as they pass between endpoints. Passive techniques are limited to recording packet traces and packet arrival times, while active techniques also inject synthetic traffic into the network.

To facilitate QoS measurements, RTP is often used in conjunction with RTP Control Protocol (RTCP). When both endpoint devices support RTCP, latency metrics such as round trip time (RTT) can be calculated using a passive technique, without the need to generate synthetic packets. However, some legacy endpoint devices do not support RTCP. As a result, passive techniques using RTCP observations alone can not be used in general for measuring latency between endpoints. To overcome these problems, active techniques may be used.

An example of an active technique is the PacketShaper® network management device by Blue Coat Systems, Inc. It includes a VoIP metrics feature to measure latency between two PacketShaper devices positioned near the endpoint devices. An active RTP flow between the endpoints causes the PacketShaper to generate its own RTP probe packets whose headers contain a timestamp, sequence number, and unit ID information. This header information is used by the PacketShapers to measure the round-trip time between the two PacketShaper devices. It is significant to note that this technique always requires the use of two PacketShaper devices, one at each endpoint. In addition, because the probe packets are generated throughout the entire duration of every active RTP flow, they can add as much as 5% to the network bandwidth requirements. Moreover, in the case where the endpoints do support RTCP, the synthetic RTP packets unnecessarily adds to network bandwidth overhead.

SUMMARY OF THE INVENTION

The present invention provides improved techniques for facilitating network latency measurements of RTP traffic using an intermediate network device positioned between endpoints that do not necessarily support RTCP. During an active RTP stream between two endpoints, the intermediate device detects whether the endpoints are already providing their own RTCP packets and responding to RTCP packets from the other endpoint. If so, nothing need be done. If not, the intermediate device generates RTCP packets (not RTP packets). The RTCP packets are generated on behalf of the non-responsive or non-providing endpoint(s), acting as a proxy for the endpoint(s), so the packets appear to one endpoint as if they were generated by the other endpoint. Thus, if at least one endpoint supports RTCP, a single intermediate device is sufficient to generate the RTCP packets that allow the latency calculation to be performed.

According to one aspect, a method is provided for facilitating latency measurements at intermediate network devices between a first endpoint device and a second endpoint device connected by a computer network, where the intermediate network devices are positioned in the computer network between the first and second endpoint devices.

The intermediate network device may be positioned closer to the first endpoint device, preferably between the first endpoint device and a wide area network. Alternatively, the intermediate network device may be positioned closer to the second endpoint device, preferably between the second endpoint device and a wide area network. There may be two such intermediate network devices, each positioned closer to one of the two endpoints.

The intermediate network device determines when there is an active RTP stream between the first and second endpoint devices, e.g., by periodically checking network data at predetermined configured intervals for an active RTP stream between the endpoints. When there is an active RTP stream, the intermediate device determines whether the first endpoint device is responding to RTCP packets from the second endpoint device, e.g., by determining whether a predetermined time interval has elapsed during which no RTCP packets are detected from the second endpoint device. The intermediate network device also determines whether the first endpoint device is providing RTCP packets to the second endpoint device. If, during the active RTP stream, either i) the first endpoint device is not responding to RTCP packets from the second endpoint device and/or ii) the first endpoint device is not providing RTCP packets to the second endpoint device, then the intermediate network device generates and transmits RTCP packets to the second endpoint device, preferably at periodic predetermined configured intervals. The RTCP packets contain timing information that enables the calculation of RTP latency between the first and second endpoints. Moreover, the RTCP packets preferably contain a SSRC id, UDP port, and IP address of the first endpoint so that the generated RTCP packets appear to be generated by the first endpoint device.

The intermediate network device preferably detects RTCP packets sent between the two endpoints, records timestamps of the detected RTCP packets, and reports latency at the termination of the active RTP stream between the endpoints. During an active RTP stream, if the first endpoint device is responding to the RTCP packets from the second endpoint device, the intermediate device calculates a round trip time from the RTCP packets, preferably using a mapping between current local time (LLSR) and a NTP timestamp. The intermediate device may also calculate the round trip time from a current time of the intermediate device, current local time (LLSR) and DLSR.

DETAILED DESCRIPTION

Figure 1A:
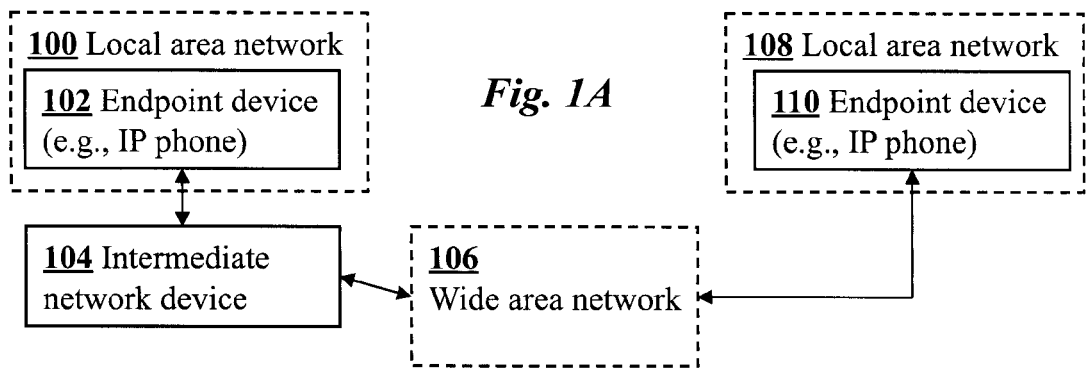
FIGS. 1A and 1B are block diagrams of networks using one and two intermediate devices, respectively, between two endpoint devices, according to two embodiments of the invention.
Figure 1B:
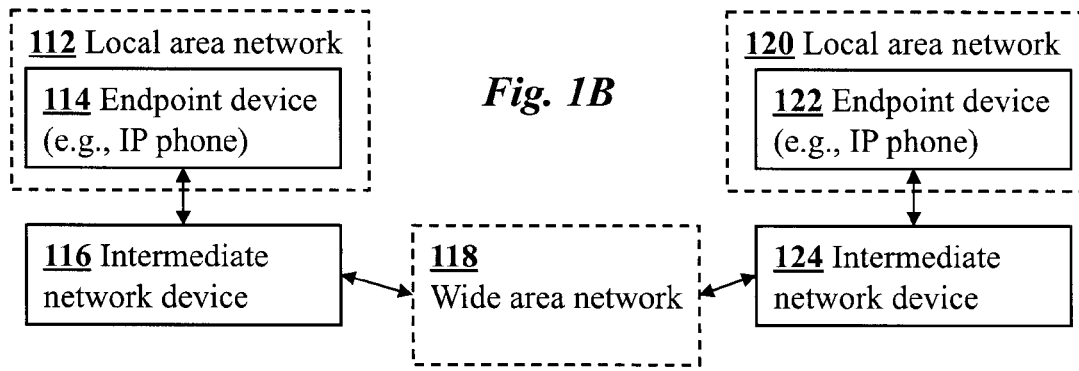

FIGS. 1A and 1B illustrate computer data networks illustrating two implementations of the invention. FIG. 1A illustrates a configuration in which just one intermediate device is sufficient. A first local area network (LAN) 100 containing a first endpoint device 102 is connected via a wide area network (WAN) 106 to a second LAN 108 containing a second endpoint device 110. Second endpoint device 110 supports RTCP while first endpoint device 102 does not necessarily support RTCP. A single intermediate device 104 in this configuration is positioned between the two endpoint devices 102 and 110 and generates RTCP packets, when needed, on behalf of first endpoint device 102. As shown in this example, the intermediate device 104 is positioned at the edge between LAN 100 and WAN 104, i.e., closer to the first endpoint device 102. In general, however, the intermediate device 104 could be positioned within LAN 100 or within WAN 106. The intermediate network device 104 is preferably positioned closer to the first endpoint device 102, most preferably between the first endpoint device and WAN 106. Alternatively, the intermediate network device may be positioned closer to the second endpoint device 110, preferably between the second endpoint device and a WAN 106.

FIG. 1B shows an embodiment using two intermediate network devices, each positioned closer to one of the two endpoints. This is appropriate when neither endpoint device 102 nor endpoint device 110 supports RTCP. A first local area network (LAN) 112 containing a first endpoint device 114 is connected via a wide area network (WAN) 118 to a second LAN 120 containing a second endpoint device 122. Two intermediate devices 116 and 124 in this configuration are positioned between the two endpoint devices 114 and 122. As shown in this example, the intermediate devices 116 and 124 are positioned at the edges between WAN 118 and their respective LANs 112 and 120.

The network connections between the devices described above may be implemented using standard network protocols and wired or wireless connections, and may include various other devices such as routers, servers, firewalls, and other endpoint devices. Each of intermediate devices 104, 116, 124 contains standard network interface hardware, memory, and processor. The memory contains machine readable instructions capable of being executed by the processor to implement a method for facilitating latency measurements, as will be described in detail below. In addition the instructions may implement various other conventional network monitoring, analysis, and management techniques.

Figure 2:
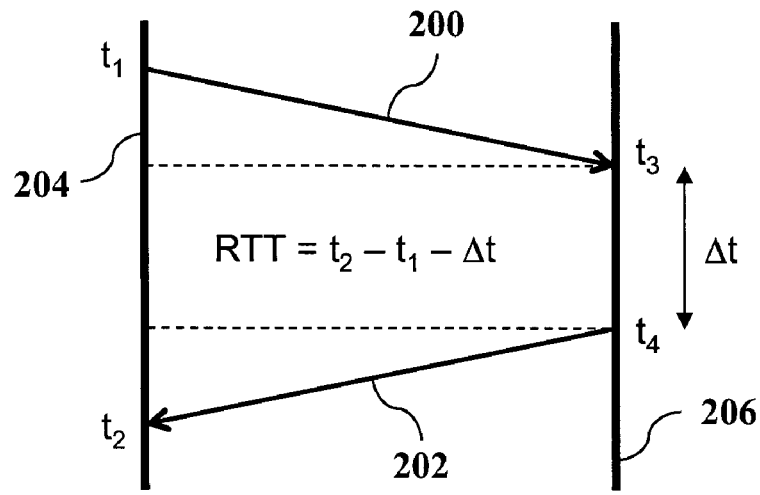
FIG. 2 is a sequence diagram illustrating the flow of packets between two endpoint devices and the calculation of the round-trip time.

FIG. 2 is a sequence diagram illustrating the flow of packets between two endpoint devices represented by lines 204 and 206. A packet 200 is transmitted from endpoint device 204 at time $t_1$ and is received at endpoint device 206 at a later time $t_3$. Device 206 processes the packet and transmits a return packet 202 at time $t_4$ to endpoint device 204. Device 206 thus processes the packet for a known time $\Delta t = t_4 - t_3$. The packet 202 is received by device 204 at time $t_2$. The network latency between endpoints, or round-trip time (RTT), is defined as the duration of time that the packets spent during propagation back and forth between the two endpoint devices, i.e., RTT $= (t_2 - t_4) + (t_3 - t_1)$. Equivalently, the RTT is equal to total time between transmission of the first packet at time $t_1$ and reception of the second packet at time $t_2$ minus the processing time $\Delta t$ during which no packet was in transit, i.e., RTT $= (t_2 - t_1) - \Delta t$. Endpoint device 204 knows times $t_1$ and $t_2$ and can thus calculate RTT provided it obtains $\Delta t$ from device 206, e.g., as part of the information contained in packet 202.

As will be detailed below in relation to FIG. 3, the intermediate devices monitor the RTP streams for the presence of RTCP packets. If no RTCP packets are detected within a specified period of time, the intermediate devices will generate the needed RTCP packets on behalf of the endpoints and insert the appropriate timestamps. If RTCP packets are detected, the intermediate devices will note the time each packet is received and report the latency at the termination of the RTP stream. In the case where an intermediate device is generating RTCP packets, the packets are preferably sent periodically and at regular is configured intervals. The intermediate device inserts the SSRC id, UDP port and IP address of the endpoint that does not support RTCP such that the remote end involved in the stream will respond with RTCP packets if RTCP is supported by the remote endpoint. This implementation allows the intermediate devices to be deployed in scenarios where one, both or none of the VoIP endpoints support RTCP.

Figure 3:
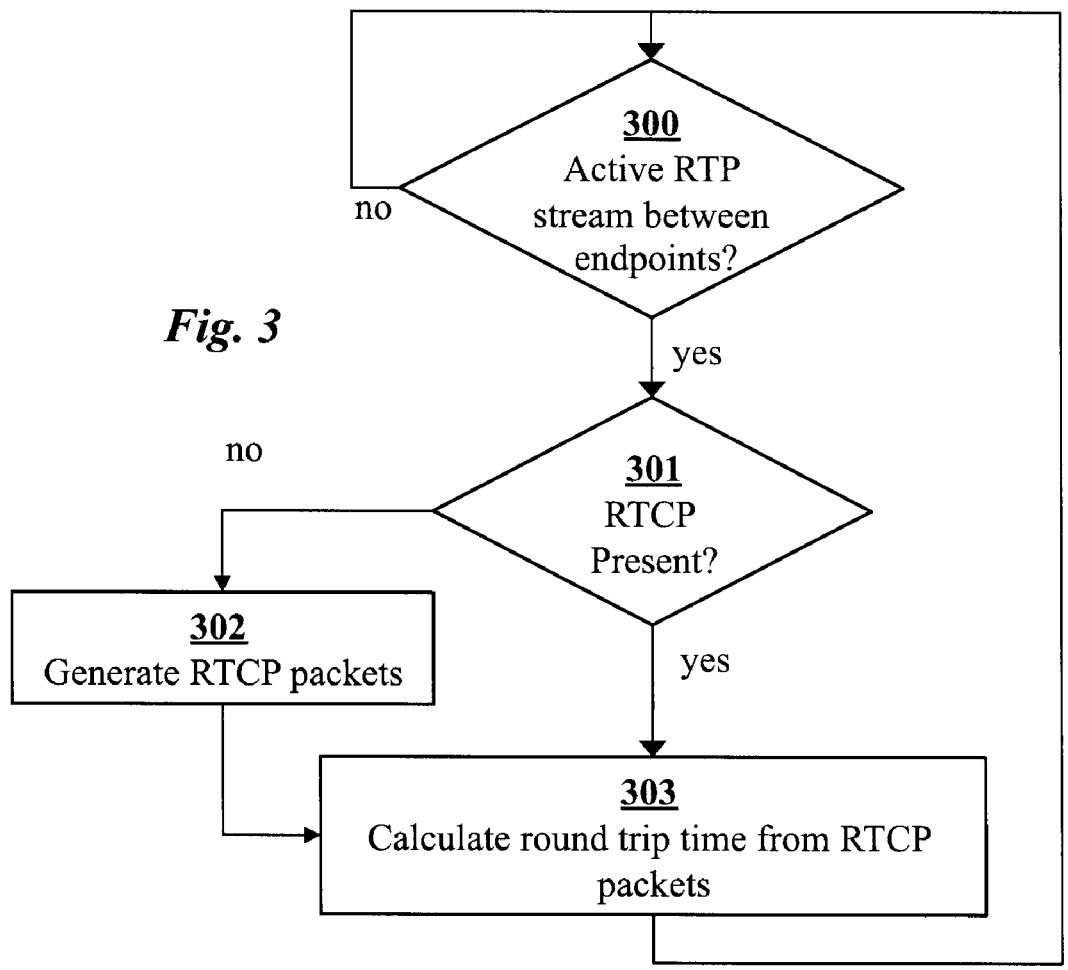
FIG. 3 is a flow chart illustrating main steps in a method implemented at an intermediate network device, according to an embodiment of the invention.

FIG. 3 is a flow chart illustrating main steps in a method for facilitating latency measurements implemented at an intermediate network device positioned between first and second endpoint devices, according to an embodiment of the invention. In the following description, it will be assumed without loss of generality that the intermediate device is positioned close to the first endpoint device. It may alternatively be placed close to the second endpoint device, or at another position between the two endpoints. Also, there may, in general, be an intermediate device close to just one of the endpoint devices, or two devices positioned near both endpoint devices.

In step 300, the intermediate network device determines whether or not there is an active RTP stream between the first and second endpoint devices. For example, the device can periodically examine the network packets flowing in both directions through the device to see if the packets indicate an active RTP stream flow between the endpoints. The periodic checks for RTP packets can be performed every T seconds, where T is a predetermined time interval. If no active RTP stream is detected, the process control returns to step 300 and checks again after T seconds. If there is an active RTP stream detected, control is passed to step 301.

In step 301, the intermediate device determines whether the first endpoint device is sending RTCP packets to the second endpoint device, e.g., by determining whether a predetermined time interval has elapsed during which no RTCP packets are detected from the first endpoint device. If the first endpoint device is not sending RTCP packets to the second endpoint device, control is passed to step 302. If the first endpoint device is sending RTCP packets to the second endpoint device, control is passed to step 303.

If, during the active RTP stream, either i) the first endpoint device is not responding to RTCP packets from the second endpoint device (step 301) and/or ii) the first endpoint device is not providing RTCP packets to the second endpoint device (step 301), then control is passed to step 302. In step 302, the intermediate network device generates and transmits RTCP packets to the second endpoint device, preferably at periodic predetermined intervals. In other words, if the time since the last generated RTCP packet is greater than a predetermined time interval T2, then the intermediate device will send an RTCP packet (i.e., Sender Report with appropriate report block). The intermediate device will also save the currently local time (LLSR) and insert this timestamp value as the NTP timestamp (TS) in the Sender Info block in the created packet. The RTCP packets contain timing information that enables the calculation of RTP latency between the first and second endpoints. Moreover, the RTCP packets preferably contain a SSRC id, UDP port, and IP address of the first endpoint so that the generated RTCP packets appear to be generated by the first endpoint device. Control is then returned to step 300.

In step 303, the intermediate device notes that the first device supports RTCP (if RTCP packets were detected in step 301) and then calculates from the RTCP packets the round trip time between the first and second endpoints. In other words, during an active RTP stream, if the first endpoint device is sending RTCP packets to the second endpoint device, the intermediate device calculates a round trip time from the RTCP packets, preferably using a mapping between current local time (LLSR) and a NTP timestamp. The intermediate device may also calculate the round trip time from a current time of the intermediate device, current local time (LLSR) and DLSR. In addition, the intermediate network device preferably detects RTCP packets sent between the two endpoints, records timestamps of the detected RTCP packets, and reports latency at the termination of the active RTP stream between the endpoints. Control is then passed to step 300.

The intermediate device preferably also performs the above steps for the packets flowing in the opposite direction, i.e., by exchanging the roles of first and second endpoint devices in the above description. In other words, if during the active RTP stream, either i) the second endpoint device is not responding to RTCP packets from the first endpoint device and/or ii) the second endpoint device is not providing RTCP packets to the first endpoint device, then the intermediate network device generates and transmits RTCP packets to the first endpoint device.

The intermediate device preferably processes RTCP packets for the purpose of calculating round trip time (RTT) using the following approach. An RTCP packet is checked for a Sender Report (SR) or Receiver Report (RR) containing a report block. For a Sender Report sent from the first endpoint to the second endpoint, for example, the NTP timestamp (TS) is extracted from the Sender Info block and the source identifier (SSRC) is extracted from the Report Block. The SSRC is saved in memory as well as a mapping between the current local time (LLSR) and the TS to correlate subsequently received RTCP packets (from second endpoint to first endpoint) as a part of the same stream. This mapping is also important because there is no time synchronization between the hosts and it enables the ID to calculate RTT using its LLSR. The RTCP packet is then forwarded to the second endpoint device.

In the case of a response RTCP packet sent from the second endpoint to the first, the SSRC and LSR values of the RTCP report block are examined to see if these are equal to values used in previously sent RTCP packets. If a match is found, the LSR and DLSR are extracted from the report block, and the LLSR previously set in (b) above is retrieved using the LSR. The RTT is then calculated as RTT=current time of intermediate device−LLSR−DLSR in received report block. The RTCP packet is then forwarded to the first endpoint.

The steps above are preferably performed in both directions (i.e., again as above, except with the roles of the first and second endpoints reversed). The bidirectional processing of packets is preferably performed simultaneously such that there are two RTT values reported by the intermediate device for any given VoIP call or other RTP stream, one for each side of the intermediate device.

The reported RTT by the intermediate device for the entire call may be computed by calculating the strict average of the results of each interval RTT calculation.

The intermediate network devices may be routers, SIP proxies, B2BUAs, etc., positioned in the network between the two endpoints. Embodiments of the invention allow such devices to calculate and report network latency independent of whether the endpoint devices support RTCP. A key distinguishing feature of this invention is the ability of the intermediate devices to act as proxies for endpoints in the network that do not support RTCP directly. Specifically, the intermediate network devices determine when an endpoint is not responding to or providing RTCP packets and then generate the needed packets on behalf of the endpoint. In other words, the generated packets appear to the receiving endpoint as if they were generated by the other endpoint.

The present method will ensure network operators have latency metrics on a consistent basis. In addition, the RTCP proxy approach used in this invention allows network operators to measure latency over more network hops than would otherwise be possible if one of the endpoints supports RTCP. That is, this approach produces a latency metric for the entire path to the endpoint instead of between intermediate devices only.

The deployment of a given intermediate device does not require knowledge or coordination with other such intermediate devices in the network in order to produce latency measurements. Each intermediate device operates independently of others and no existing configuration or association needs to be established between the intermediate devices.

The invention claimed is:

1. A method for facilitating latency measurements on a computer data network, the method comprising:
   determining by an intermediate network device when there is an active real-time transport protocol (RTP) stream between a first endpoint device and a second endpoint device connected by a computer network, wherein the intermediate network device is positioned in the computer network between the first and second endpoint devices; determining by the intermediate network device whether during the active RTP stream the first endpoint device is responding to first Real-time Transport Control Protocol (RTCP) packets from the second endpoint device; determining by the intermediate network device whether during the active RTP stream the first endpoint device is providing second RTCP packets to the second endpoint device; generating and transmitting third RTCP packets by the intermediate network device to the second endpoint device if, during the active RTP stream, at least one of the following two conditions is true: i) the first endpoint device is not responding to the first RTCP packets from the second endpoint device; and ii) the first endpoint device is not providing the second RTCP packets to the second endpoint device; wherein the generated and transmitted third RTCP packets contain timing information that enables calculation of an RTP latency between the first and second endpoints.

2. The method of claim 1 wherein the generated and transmitted third RTCP packets contain a synchronization source (SSRC) id, user datagram protocol (UDP) port, and internet protocol (IP) address of the first endpoint so that the generated and transmitted third RTCP packets appear to be generated by the first endpoint device.

3. The method of claim 1 wherein the intermediate network device is positioned closer to the first endpoint device than to the second endpoint device.

4. The method of claim 1 wherein the intermediate network device is positioned closer to the second endpoint device than to the first endpoint device.

5. The method of claim 1 wherein the intermediate network device is positioned between the first endpoint device and a wide area network.

6. The method of claim 1 wherein the intermediate network device is positioned between the second endpoint device and a wide area network.

7. The method of claim 1 wherein determining whether the first endpoint device is responding to the first RTCP packets from the second endpoint device comprises determining whether a predetermined time interval has elapsed during which no RTCP packets are detected.

8. The method of claim 1 further comprising detecting fourth RTCP packets at the intermediate network device, recording timestamps of the detected fourth RTCP packets, and reporting a latency at the termination of the active RTP stream.

9. The method of claim 1 wherein generating and transmitting the third RTCP packets is performed periodically at configured intervals.

10. The method of claim 1 wherein determining when there is the active RTP stream comprises periodically checking network data at configured intervals.

11. The method of claim 1 further comprising, if there is the active RTP stream and the first endpoint device is responding to the first RTCP packets from the second endpoint device, calculating a round trip time from RTCP packets of the active RTP stream.

12. The method of claim 11 wherein calculating the round trip time comprises using a mapping between current local time (LLSR) and a network time protocol (NTP) timestamp.

13. The method of claim 11 wherein calculating the round trip time comprises calculating the round trip time from a current time of the intermediate device, current local time (LLSR) and delay since last sender report (DLSR).

* * * * *